US009856905B2

(12) United States Patent
Servais (10) Patent No.: US 9,856,905 B2
(45) Date of Patent: Jan. 2, 2018

(54) SHACKLE WITH LOW-FORCE RELEASE SYSTEM (71) Applicant: David Soderberg Servais, San Diego, CA (US)

(72) Inventor: David Soderberg Servais, San Diego, CA (US)

( * ) Notice: Subject to any disclaimer, the term of this patent is extended or adjusted under 35 U.S.C. 154(b) by 282 days.

(21) Appl. No.: 14/723,406

(22) Filed: May 27, 2015

(65) Prior Publication Data
US 2015/0345539 A1 Dec. 3, 2015

Related U.S. Application Data (60) Provisional application No. 62/003,462, filed on May 27, 2014.

(51) Int. Cl.
*F16B 45/02* (2006.01)

(52) U.S. Cl.
CPC ....... *F16B 45/025* (2013.01); *Y10T 24/45319* (2015.01)

(58) Field of Classification Search
CPC ........ F16B 45/025; F16B 45/02; B63B 21/54; Y10T 24/45319; Y10T 24/45372; Y10T 24/45293; Y10T 24/45435; Y10T 24/45346; Y10T 24/45366
See application file for complete search history.

(56) References Cited

U.S. PATENT DOCUMENTS

| 1,545,377 | A | * | 7/1925 | Westmoreland | .......... B66C 1/36 24/599.1 |
| 1,711,440 | A | * | 4/1929 | Baker | ..................... E21B 19/04 24/600.7 |
| 3,930,290 | A | * | 1/1976 | Mangels | .................. B66C 1/36 114/108 |
| 4,093,293 | A | * | 6/1978 | Huggett | ................. F16G 15/04 114/113 |
| 4,279,062 | A | * | 7/1981 | Boissonnet | .............. B66C 1/36 24/305 |

(Continued)

FOREIGN PATENT DOCUMENTS

| EP | 0061257 A1 | * | 9/1982 | ............ E04G 7/305 |
| EP | 0148928 B1 | | 10/1988 | |

(Continued)

*Primary Examiner* — Robert J Sandy
*Assistant Examiner* — Matthew Sullivan
(74) *Attorney, Agent, or Firm* — Gary L. Eastman, Esq.; Eastman & McCartney LLP (57) ABSTRACT A shackle with a low-load release mechanism adaptable for remote actuation to releasably connect two entities typically one of which being a rope or a line and the other being an entity controlled or positioned by the rope or line. The shackle consists of a body, a bail, a first pivot arm, a second pivot arm configured to hold the first pivot arm in a closed position, a release cam, and an activation lanyard. The lanyard connects to the release cam such that the release cam moves the second pivot arm when tension is applied to the lanyard thereby releasing the first pivot arm into an open position. The shackle may be configured to allow a tool to open the shackle, a finger release lever, and a release lever shield. The lanyard may pass through the second pivot arm, the release cam, and a pivot boss for attaching the bail.

15 Claims, 12 Drawing Sheets (56) References Cited

U.S. PATENT DOCUMENTS

| | | | | |
|---|---|---|---|---|
| 5,769,475 A * | 6/1998 | Tylaska | ................... | F16G 15/04 |
| | | | | 24/600.1 |
| 5,904,112 A * | 5/1999 | Tylaska | ................ | B63H 9/0657 |
| | | | | 114/108 |
| 8,297,462 B1 * | 10/2012 | Joyce | ........................ | A45F 3/18 |
| | | | | 215/396 |

FOREIGN PATENT DOCUMENTS

| WO | WO1985000414 A1 | 1/1985 |
|---|---|---|
| WO | WO2007114574 A1 | 10/2007 |
| WO | WO2010090722 A3 | 11/2010 |

\* cited by examiner

SHACKLE WITH LOW-FORCE RELEASE SYSTEM

RELATED APPLICATIONS

This application is a conversion of, and claims the benefit of priority to, U.S. Provisional Patent Application for "Shackle with Low-Force Release System", Ser. No. 62/003,462, filed on May 27, 2014.

FIELD OF THE INVENTION

The present invention pertains generally to shackles for use in the boating industry. More particularly, the present invention pertains to a shackle having a low-force release mechanism capable of local or remote release. The Present invention is particularly, but not exclusively, useful as a shackle allowing a user to activate the release mechanism with low force while supporting a heavy load.

BACKGROUND OF THE INVENTION

Releasable shackles are used pervasively in many industries, activities, and vocations and, as such, are supplied by many manufacturers for a multitude of applications, environmental suitability, and load ranges. Releasable shackles typically are used at one or both ends of a line or rope so that the line or rope may be quickly and easily detached from its point of fixation. In some applications, the shackle to be released is easily reachable; however, in some applications, it is in a remote area where it is difficult or impossible for a person to reach a proximate zone of the shackle. Additionally, shackles typically are difficult or impossible to release when the line or rope that they are attached to has a substantially high tensile force and usually requires a secondary tool or release device to open the shackle while under load. In some applications, it is not only desirable but also necessary to release certain shackles while under this relatively high loading scenario.

Therefore, there is a need in the art of shackle design and manufacturing for a device that has a releasable mechanism that operates under a relatively high loading situation as well as to provide a release system that can be operated remotely.

SUMMARY OF THE INVENTION

The following presents a simplified summary of the invention in order to provide a basic understanding of some of the aspects of the device. This summary is not an extensive overview of the innovation. It is not intended to identify key/critical elements of the innovation or to delineate the scope of the invention. Its sole purpose is to present some concepts of the innovation in a simplified form as a prelude to the more detailed description that is presented later.

The innovation disclosed and claimed herein, in one aspect thereof comprises a releasable shackle device with a mechanism that provides for both a low-force and a remotely operated release mechanism. In certain aspects, the device works by presenting multiple lever arm components that work in conjunction with each other to provide mechanical advantage, which lowers the force needed to actuate the release system. In this embodiment, levers with different lengths, opposed pivot points, and pivotal rotational directions form the configuration where one lever is actuated by the person or device that is performing the step of opening the shackle and, simultaneously, that lever impinges on a lever that is connected to or forms the shackle lock mechanism. The geometric arrangement of the lever arm lengths, the pivotal rotational directions, and positions of the pivot points provides for a multiplying of mechanical force, which results in a lower force to release the shackle.

In another embodiment of the invention, the mechanical advantage of the release system innovation provides for a means to remotely release the release system as remote release systems typically require a lower load to be functional. In one embodiment of the remote release system, the release lever is actuated by a line that may be pulled in tension to provide force on the release lever in the direction causing the lever to rotate to and impinge on the lever attached to the shackle lock mechanism. Line is to be understood in its broadest form to include, but not be limited to, line, rope, cord, cable or wire. This release line may route through other parts on the shackle's centerline and then to some remote location.

In yet another embodiment of the invention, an optional third release lever is added to the previously presented embodiments. This third release lever is added to the present multiple release means: one release means by way of the remote cord and one by way of actuation by a person's hand or finger.

BRIEF DESCRIPTION OF THE DRAWINGS

FIG. 5 is a front view of the release cam;

DETAILED DESCRIPTION OF THE INVENTION

This description describes multiple aspects of releasable and remotely releasable shackles as illustrated in the drawings. However, there is no intent to limit this disclosure to a single aspect or aspects that are disclosed herein. On the contrary, the intent is to cover multiple alternatives, modifications, and equivalents included within the spirit and scope of this disclosure and as defined by the appended claims.

This disclosure describes several aspects for a releasable or remotely releasable shackle that is typically used to provide a strong, durable, and environmentally robust means for easily releasing a connection between two or more entities typically connected with a line or rope or other connection means. The multiple embodiments of this invention represent many improvements over existing shackle designs such as but not limited to: lower force needed to release the shackle, ability to change the force needed to release the shackle, increased strength, remote releasability, improved ergonomic design, marine and non-marine suitability, better strength to weight ratio, and others.

FIGS. 1 through 9 depict a shackle 1 that has a somewhat traditional shape. Those skilled in the art of shackles and other releasable devices understand that many different sizes and shapes are widely used in industry and for special purposes such as marine applications and specifically sailing and sailboat racing. The shackle 1 employs a shackle pivot arm 2 that is pivotally moveable about the axis defined by the centerline of the shackle pivot 4. The shackle pivot 4 connects the shackle pivot arm 2 to the shackle body 3 and provides for pivoting movement of the shackle pivot arm 2 relative to the shackle body 3. The shackle pivot 4 may be any one of a screw, screw plus an additional bushing, rivet, shoulder rivet, roll pin, pushpin, set screw, or other axial fastener that allows the shackle pivot arm 2 to rotate relative to the shackle body 3. In some embodiments of the present invention, shackle pivot 4 is a threaded fastener of the type to receive a tool to drive it rotationally including but not limited to: Phillips head, torx, star, cross, flat, hex, Roberts, or others. In certain embodiments of the present invention, shackle pivot 4 further consists of a shackle pivot spring 39 configured to apply a force to the shackle pivot arm 2 such that the shackle pivot arm 2 moves from the closed position to the open position when the shackle pivot arm 2 is released.

The upper portion of the shackle 1 including the shackle pivot arm 2 and the upper portion of the shackle body 3 forms one of a connection point of the shackle 1 that is the releasable connection point. Additionally, the shackle 1 employs a bail 23 which provides for another one of a connection point that is not releasable though those skilled in the art of shackles and other releasable devices understand that the device can be configured to have one or more releasable attachment means and none, one or multiple unreleasable attachment means. Additionally, the bail 23 may be in any one of a variety of shapes and sizes. The bail 23 is rotatably attached to the shackle body 3 by a fitting comprised of an opening in the bail 23 fitting over, and being able to rotate relative to, the shackle body pivot boss 22 and is retained by ferrule 21. Ferrule 21 fits over the bottom section of the shackle body pivot boss 22 and is retained to the shackle body pivot boss 22 by any one or more of a variety of different fasteners including, but not limited to, screw, screw plus an additional bushing, rivet, shoulder rivet, roll pin, push pin, set screw, or other axial fastener. The ferrule 21 may be of a one piece or a multiple piece design and may include one or more washers 45 either to distribute loads or to provide less friction to enable the rotation of the bail 23 relative to the shackle body pivot boss 22.

All of the basic shackle 1 parts herein described above may be fabricated with any one or more of a variety of materials or combination of materials including, but not limited to, stainless steel, steel, bronze, aluminum, plastic, reinforced plastic, carbon fiber, glass reinforced plastic, metal alloy, and others as well as any of the aforementioned materials with a coating such as, but not limited to, anodizing, paint, zinc, zinc-chromate, clear coat, and others.

Figure 1:
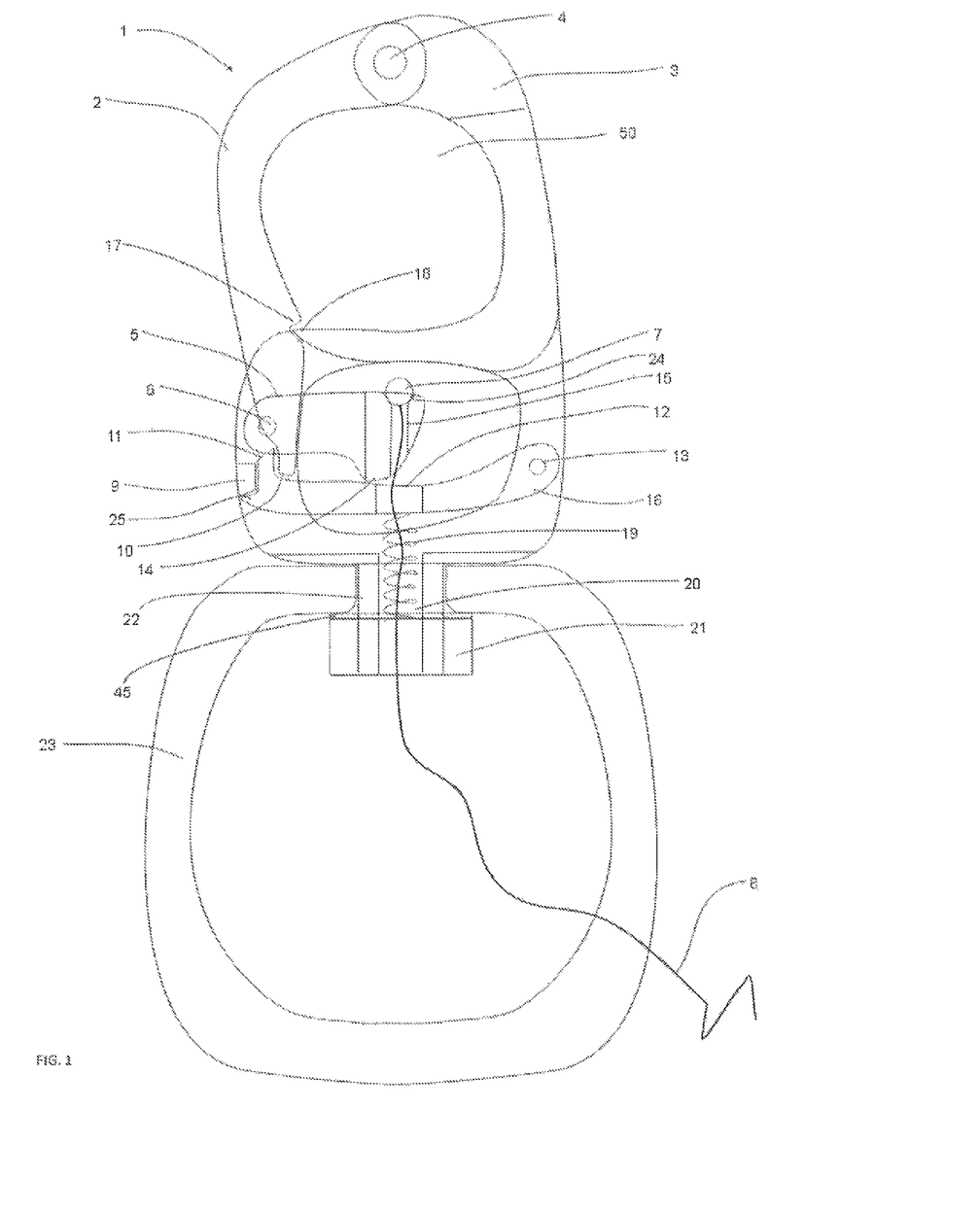
FIG. 1 is a front view of a shackle with dual lever remote release system shown in the latched position.

Referring specifically to FIG. 1, the shackle 1 is shown in a "closed" or "locked" condition where the locking and releasing features exist in a closed condition until an operator releases the shackle 1. In this configuration, the spring 19 is in its most extended position while contained in the spring bore 20 of shackle body pivot boss 22 and is providing an upwards force on the pivot arm 16 which causes the pivot arm 16 to rotate clockwise about the pivot arm pivot 13. In this position, the pivot arm 16 provides an upward force on the release cam 5 such that the release cam 5 is pivoted counter clockwise to its most upward position about the release cam pivot 6 and the pivot arm 16 is in contact with the release cam 5 at the release cam activation surface 14.

The pivot arm latch 11 on pivot arm 16 rotates clockwise about pivot arm pivot 13 up to a position where the shackle pivot arm 2 is trapped by pivot arm latch 11 and prevented from rotating about shackle pivot 4 as the shackle pivot arm latch 10 is not free to move. This closed or latched position is defined as the most upward and clockwise rotated position of the pivot arm 16 which is where the end on the pivot arm 16 opposite of the pivot arm pivot 13 and specifically the pivot arm stop 25 engages latch stop 9 formed on shackle body 3. Additionally, this is the position where the shackle pivot arm stop 17 is engaged and overlapped with the shackle body stop 18. This optional configuration both prevents the shackle pivot arm 3 from additional rotation counterclockwise about shackle pivot 4 in the arrangement represented by FIG. 1 and provides for additional strength.

The pivot arm pivot 13 may be any one of a screw, screw plus an additional bushing, rivet, shoulder rivet, roll pin, push pin, set screw, or other axial fastener that allows the pivot arm 16 to rotate relative to the shackle body 3. If the pivot arm pivot 13 is a threaded fastener, it may have any type of arrangement to receive a tool to drive it rotationally including but not limited to Phillips head, torx, star, cross, flat, hex, Roberts, or others. Additionally, the release cam pivot 6 may be any one of a screw, screw plus an additional bushing, rivet, shoulder rivet, roll pin, push pin, set screw, or other axial fastener that allows the release cam 5 to rotate relative to the shackle body 3. If the release cam pivot 6 is a threaded fastener, it may have any type of arrangement to receive a tool to drive it rotationally including but not limited to Phillips head, torx, star, cross, flat, hex, Roberts, or others.

The spring 19 is shown as a coil or compression spring. Alternatively, the spring 19 may be replaced or enhanced with a different type of spring or mechanism design that provides for a force that causes the pivot arm 16 to reach its upward or rotated position represented in FIG. 1. Other configurations and embodiments include but are not limited to helical springs, leaf springs, coil springs, curved or bent spring steel, compressible foam or rubber, gas filled compressible tube, and others. These alternative embodiments may incorporate alternative mounting configurations and locations.

Figure 2:
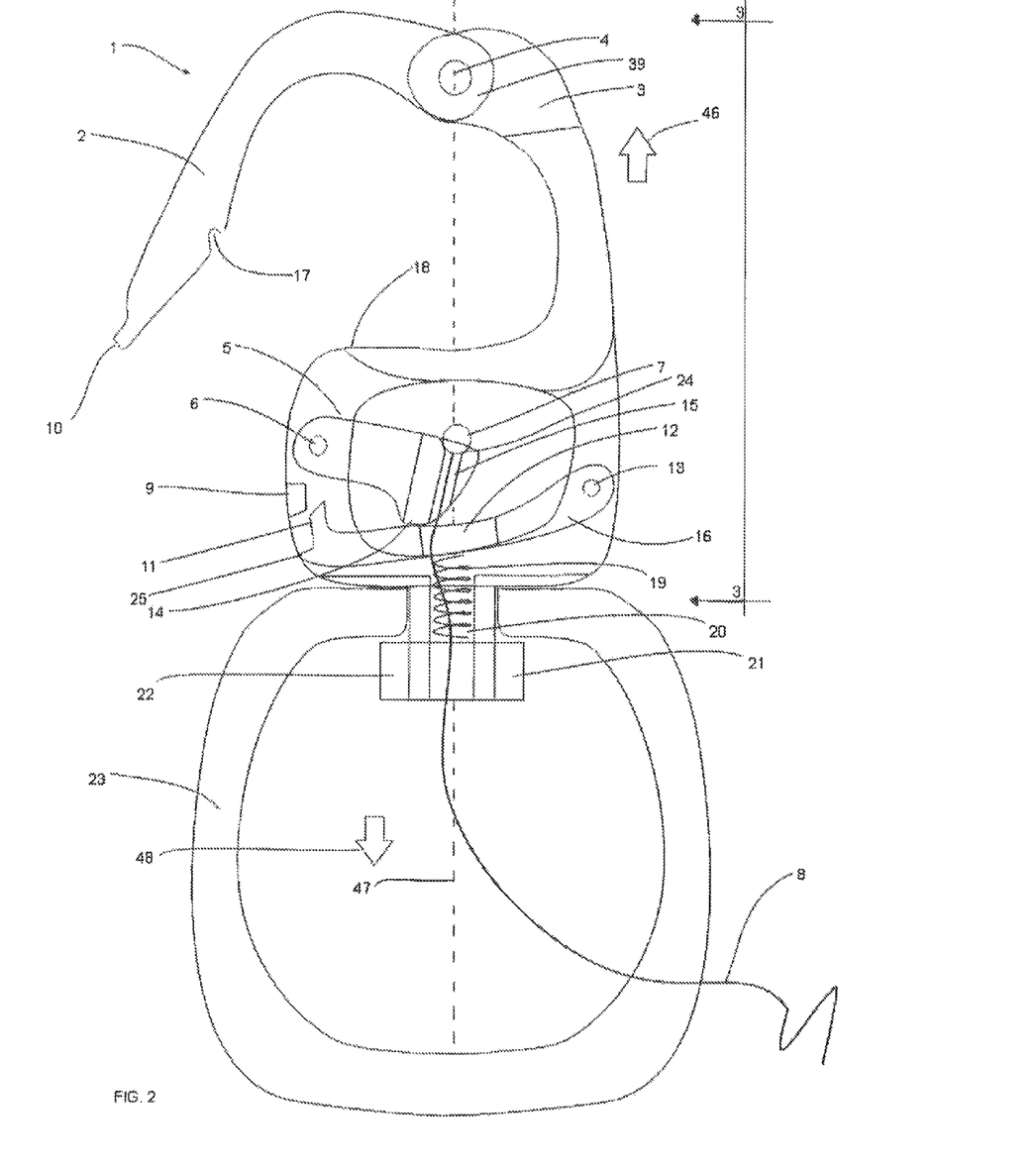
FIG. 2 is a front view of a shackle with a dual lever remote release system shown in the open position.
Figure 3:
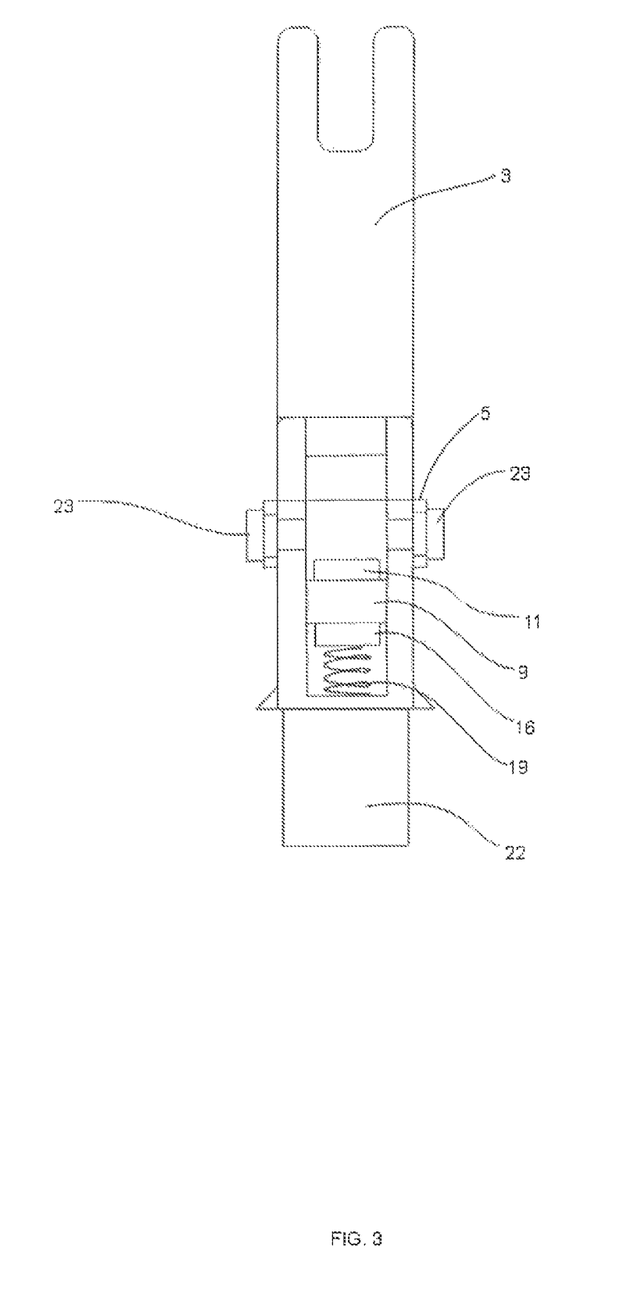
FIG. 3 is a partial side view of a shackle with a dual lever remote release system shown in the latched position.
Figure 4:
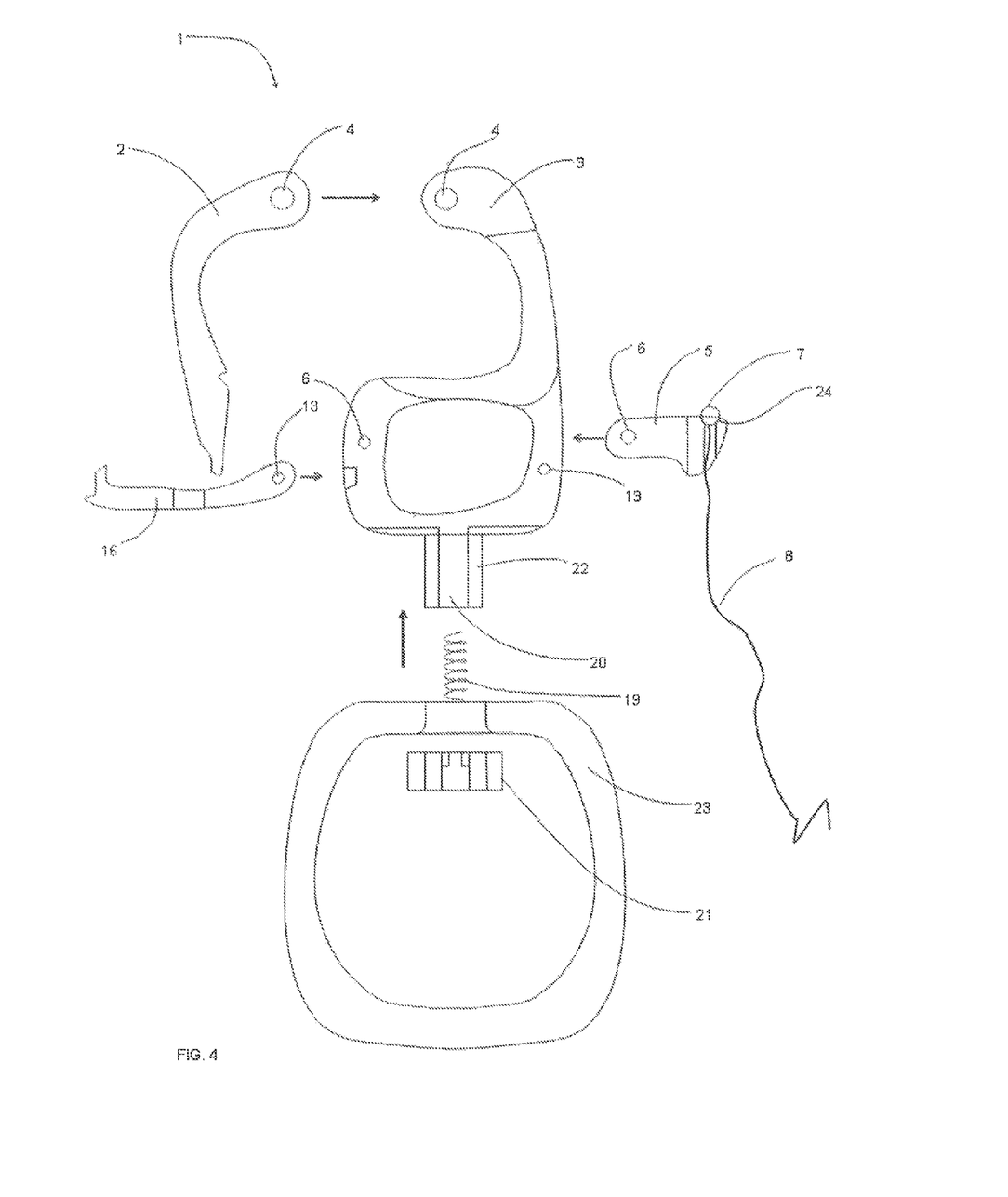
FIG. 4 is an exploded view of a shackle with a dual lever remote release system.
Figure 6:
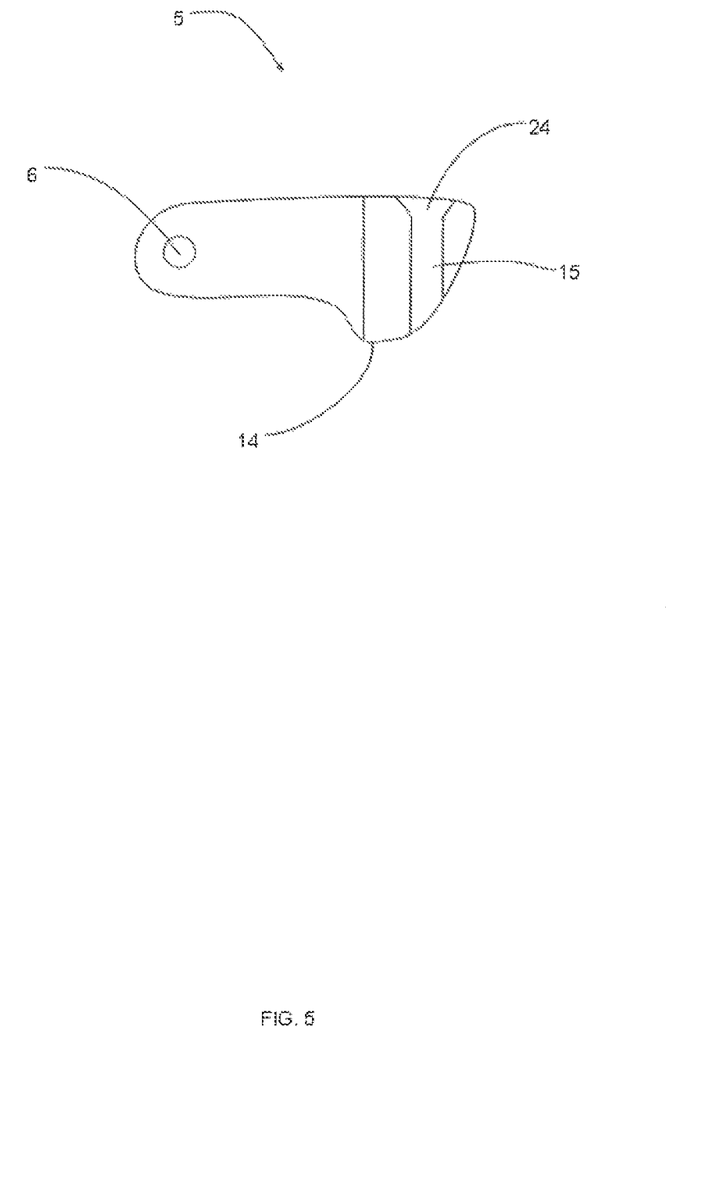
FIG. 6 is a top view of the release cam.
Figure 7:
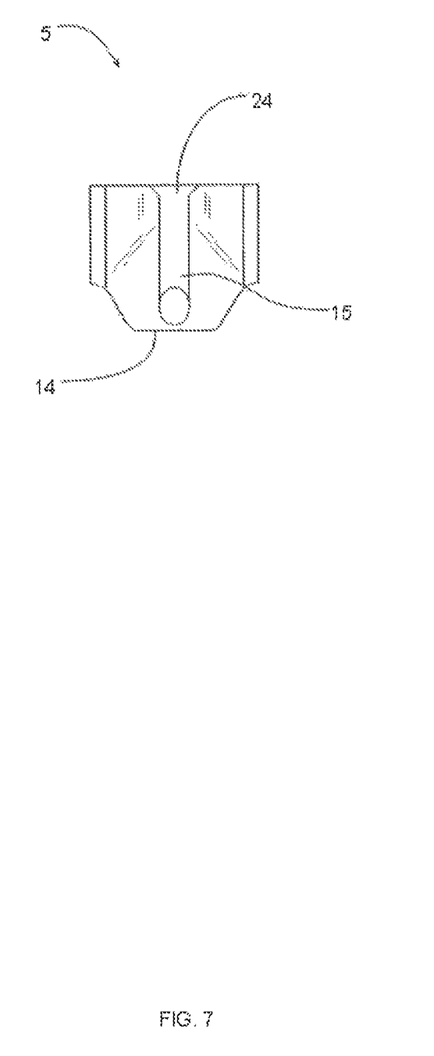
FIG. 7 is a side view of the release cam.
Figure 8:
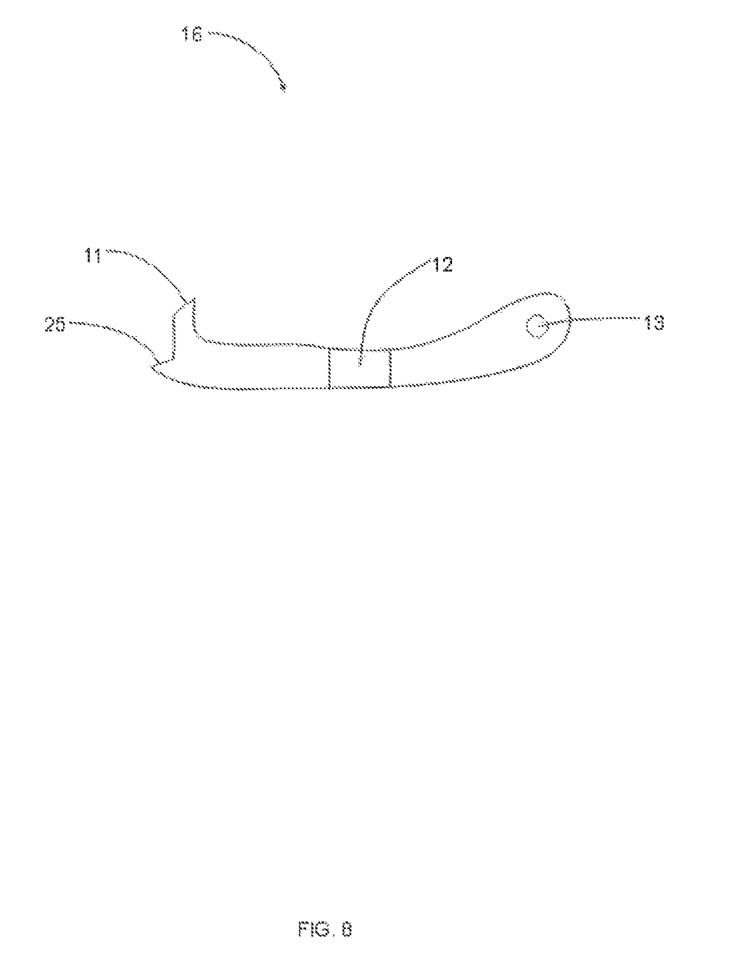
FIG. 8 is a front view of the pivot arm.
Figure 9:
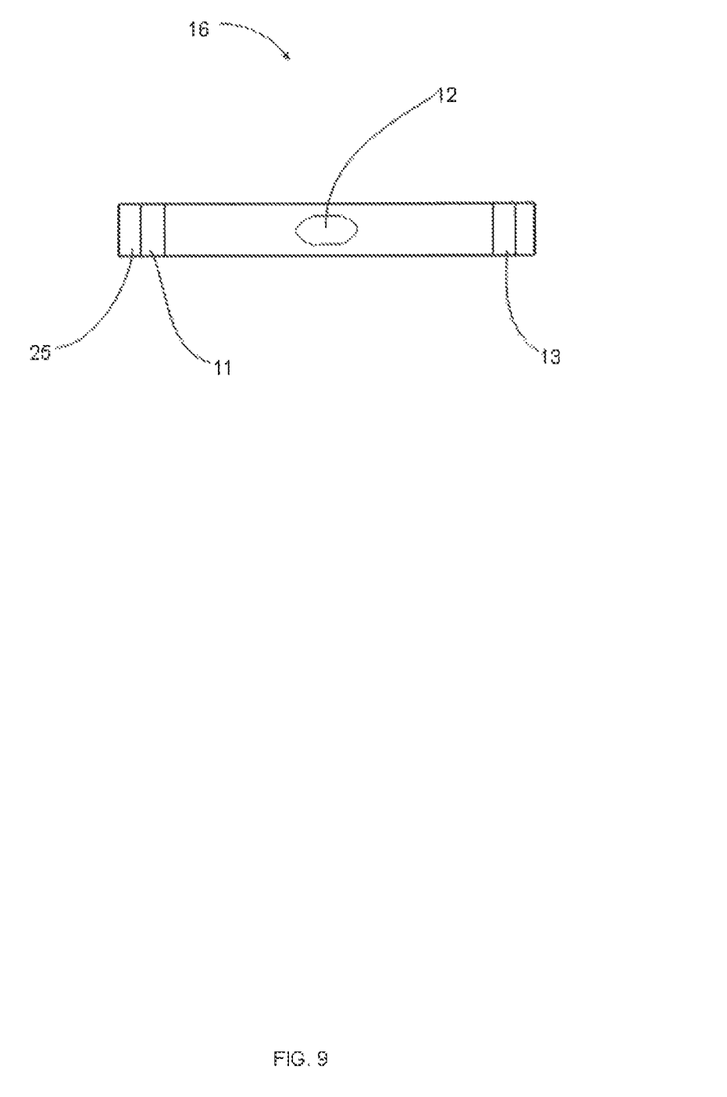
FIG. 9 is a top view of the pivot arm.

Referring to FIG. 2, the shackle 1 is shown in an "open" or "released" position. In this position, a user pulls on a lanyard 8 causing lanyard stop 7 to contact release cam 5, which rotates clockwise about release cam pivot 6 to contact pivot arm 16, which is rotated about pivot arm pivot 13 down or counterclockwise in the configuration represented by FIGS. 1 through 9. In this position, the pivot arm 16 rotates in a counterclockwise direction about pivot arm pivot 13, which compresses the spring 19 and its rotation provides for the pivot arm latch 11 to no longer impinge on and trap the shackle pivot arm latch 10 and therefore the shackle pivot arm 2 thereby providing for the ability to rotate the shackle pivot arm 2 about the shackle pivot 4 in a clockwise direction as represented by the configuration represented by FIGS. 1 through 9.

If the shackle 1 is holding a load which is typically a tensile load in the general direction 46 defined by the axis between the shackle pivot 4 and the centerline 47 of the shackle body pivot boss 22, this releasing and pivoting or rotating of the shackle pivot arm 2 will happen automatically. If the shackle 1 is not under a load or tensile load, the operator may have to manually pivot or rotate the shackle pivot arm 2. As described above, if a shackle pivot spring 39 is implemented with shackle pivot 4, shackle pivot spring 39 will cause shackle pivot arm 2 to rotate clockwise from the closed position to the open position when pivot arm latch 11 disengages shackle pivot arm latch 10.

In the preferred embodiment of the device, the shackle 1 includes a release cam 5. Also included in the preferred embodiment is a release lanyard 8 which provides for the ability to remotely release the shackle 1 from a position of the operator that could be either just away from the moving parts of the shackle 1 for safety reasons or a long distance away for safety, convenience, or both. This embodiment provides for positioning the shackle 1 in a position where operators are not able to physically reach or reside and still provides for the convenience of providing the operator an ability to release the shackle 1. In the device configuration represented by FIGS. 1 through 9, the release lanyard 8, passes from the position of the operator through the spring bore 20, the spring 19, the lanyard slot 12 on the pivot arm 16, the lanyard guide 15, and at least partially through the lanyard stop seat 24 though those skilled in the art of such devices will understand that it may not pass through the lanyard stop seat 24 and any one or more of these features may be reconfigured in size, shape, or general design that merely allows the lanyard 8 to route to the release cam 5 without binding or jamming. Additionally, the lanyard 8 terminates on the top side of the release cam 5 to a release lanyard stop 7 which engages the lanyard stop seat 24 thereby trapping and containing the release lanyard 8 such that when tension is applied in direction 48 to the release lanyard 8 by the operator or remote actuator, the release lanyard stop 7 provides a force on the release cam 5 in direction 48 that causes the release cam 5 to rotate clockwise about the release cam pivot 6 in the configuration represented in FIGS. 1 through 9. This clockwise rotation causes the release cam activation surface 14 to provide a force on the release cam 16 in direction 48 that causes the release cam 16 to rotate counterclockwise about the pivot arm pivot 13 thereby reconfiguring the condition of shackle 1 to a configuration where the shackle pivot arm 2 and the shackle pivot arm latch 10 are no longer engaged and locked by the position of the pivot arm latch 11. In this preferred embodiment, the release cam 5 and the release cam activation surface 14 both have shapes and sizes that are configured to minimize weight and sliding frictional force between the release cam activation surface 14 and the pivot arm 16. As such, the "frontal" shape of the release cam 5 is tapered on two axes though those skilled in the art of releasable devices, shackles, and mechanical articulation mechanisms understand that there are an almost infinite number of different shapes and sizes of this device that would function equally well.

The release lanyard 8 may be fabricated by any one or more of a variety of types including, but not limited to wire, wire rope, cable, braided rope or line, twisted rope or line, single strand rope or line, monofilament, and any of these may be made from a variety of materials included but not limited to stainless steel, steel, aluminum, spectra, parachute cord, dynema, nylon, polyester, kevlar, aramid fibers, carbon fiber, and others. Additionally, the release lanyard stop 7 may be configured and fabricated in any one or more of a variety of configurations and materials including but not limited to pressed ball, knot, nicropress, square shaped, other shapes, screwed, peened, riveted, cross pinned, stainless steel, plastic, steel, aluminum, alloys, carbon fiber, glass reinforced plastics and other configurations and materials. Additionally, the lanyard stop seat 24 is shown in a beveled arrangement. Alternatively, the lanyard stop seat 24 may be configured in any one or more of different configurations including but not limited to countersunk, flush, oval, circular, square, polygonal, and other shapes and configurations. Additionally, the release lanyard 8 may be contained within the line, rope, or other item that is connected to the bail 23 in a concentric or non-concentric fashion.

Still referring to FIGS. 1 through 9, the release configuration shown as a preferred embodiment that includes the release cam 5 is configured in a manner to reduce the force required to release the shackle 1. In this preferred embodiment configuration the combination of the device having the pivot arm 16 and the release cam 5 provides for a "double cam" or "double lever" release system. The utilization of the double cam approach magnifies the force provided by release cam 5, when the release cam 5 engages pivot arm 16 thereby reducing the total force required to move the release cam 5 manually, remotely via the lanyard 8, or by other means of actuation.

Though the Figures and this Detailed Description present a single configuration for the resulting mechanical advantage of the double cam arrangement, there are infinite different combinations of the lever lengths of the release cam 5. In a preferred embodiment, the lever lengths are measured 1) from the center of the release cam pivot 6 to the center of the lanyard guide 15, and 2) from the centerline of the lanyard guide 15 to the center of the release cam activation surface 14, and 3) from the center of the release cam activation surface 14 to the pivot arm latch 11, as well as the lever arm lengths of the pivot arm 16. The lever arm lengths of the pivot arm 16 are measured 1) from the pivot arm latch 11 to the centerline of the pivot arm pivot 13, 2) from the centerline of the pivot arm pivot 13 to the point, line, or plane where the release cam activation surface 14 touches the pivot arm 16, and 3) from the pivot arm latch 11 to the point, line, or plane where the release cam activation surface 14 engages the pivot arm 16. In most cases, varying these dimensions to reduce the force needed to release the shackle 1 is the most desirable configuration although, in some cases, configuring the dimensions to create a condition where a higher force is necessary to release the shackle may also be desirable so as to avoid accidental release events.

Figure 10:
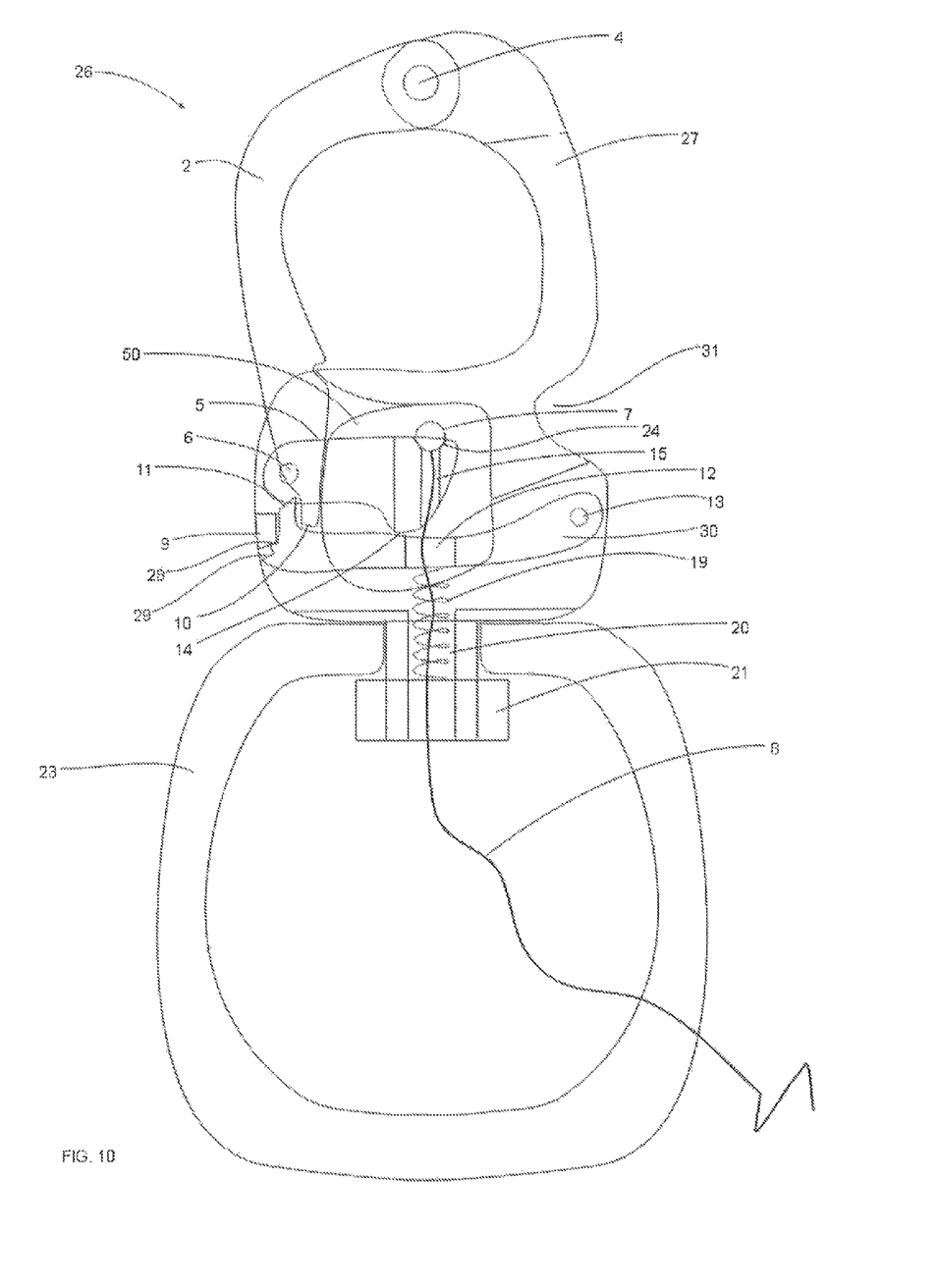
FIG. 10 is a front view of an alternative embodiment of the shackle of the present invention with a remote release mechanism and a tool activated release point shown in the latched position.

Referring to FIG. 10, the shackle 26 represents an alternative embodiment of the device and method design. As most of the features are similar to or identical to the features of the shackle 1, this description will focus on and highlight only the differences between the embodiment of shackle 1 and the embodiment of shackle 26. In this configuration, the "open area" 50 of the shackle body 2 has been reduced; this adds strength and provides for an ergonomic feature providing a shackle handle 31 contained on the shackle body with handle 27 which is shown as an indentation that an operator's finger will fit into providing for a feature to grip the shackle 26 to prevent it from slipping out of the operator's hand. The shackle handle 31 may be in a variety of shapes and sizes. Additionally, the shackle 26 includes a pivot arm release 29 and, correspondingly, a pivot arm with release 30 that employs a pivot arm with release stop 28. The pivot arm release 29 and the pivot arm with release stop 30 allow an operator to insert a finger or an actuation release tool to release the shackle pivot arm 2 without providing tension on the release lanyard 8.

Figure 11:
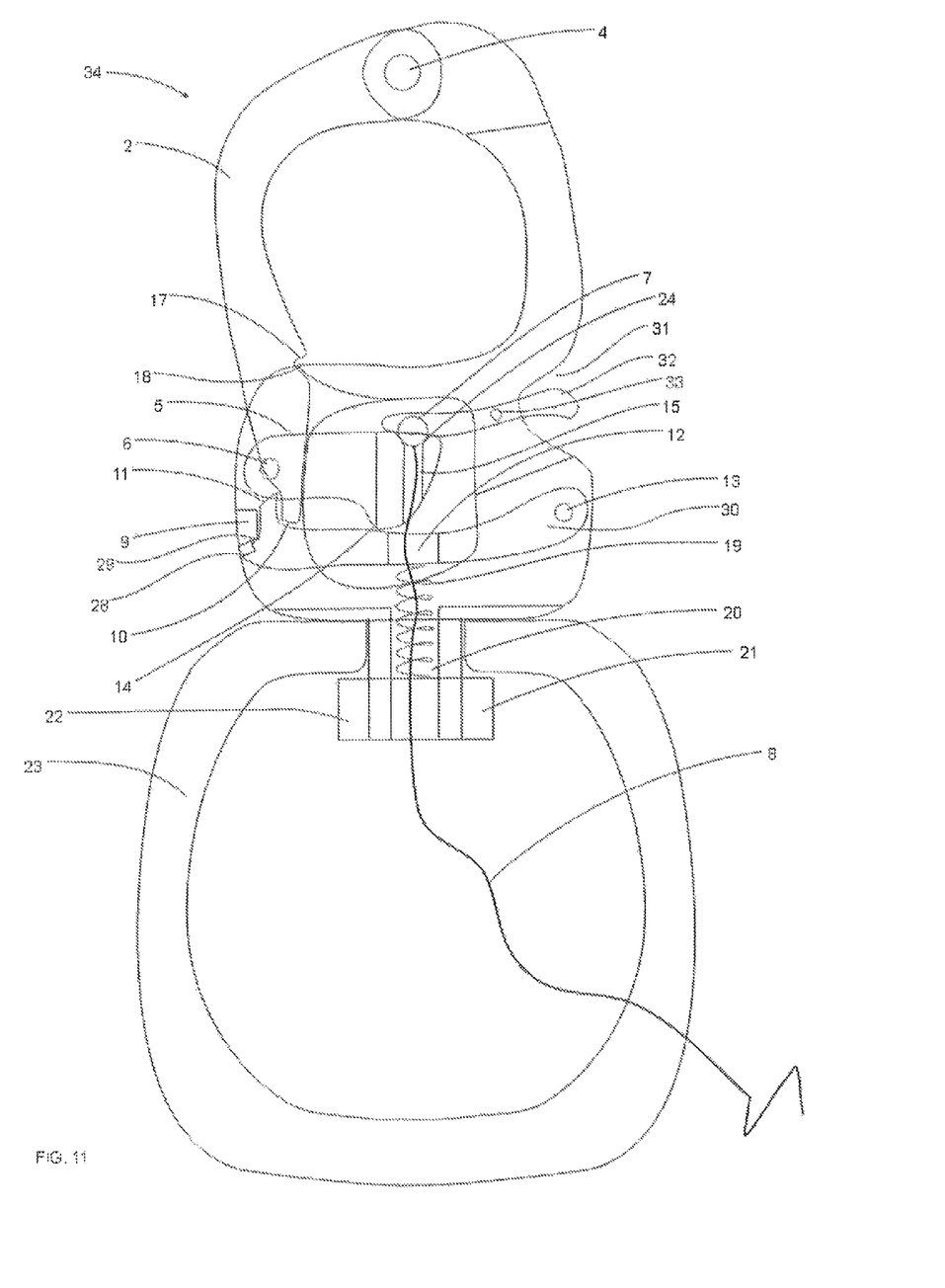
FIG. 11 is a front view of a shackle with a remote release mechanism, a tool activated release point, and a finger release lever shown in the latched position.

Referring to FIG. 11, the shackle with release lever 34 represents another embodiment of the device and method design. As most of the features are similar to or identical to the features of the shackle with handle 26, this description will focus on and highlight only the differences between the embodiment of shackle with handle 26 and the embodiment of shackle with release lever 34. Specifically, the shackle 34 includes a finger actuated release lever 32 that rotates about the finger release lever pivot 33. When an operator actuates the finger release lever 32 counterclockwise as represented by the configuration of FIG. 11, the release lever 32 engages release cam 5 by applying a force in direction 48, which, in turn, follows the sequence described above to release the shackle pivot arm 2 of shackle 34. The addition of the release lever 32 provides for a third way to release the shackle with release lever 34. This configuration provides for a dual force release arrangement as the length of the pivot arms associated with the release lever 32 can be configured to provide for a different force applied to the release lever 32 as compared to the force required to release the shackle 34 by an operator actuating the pivot arm release feature 29 or the required amount of force applied to the release lanyard 8 in direction 48.

Figure 12:
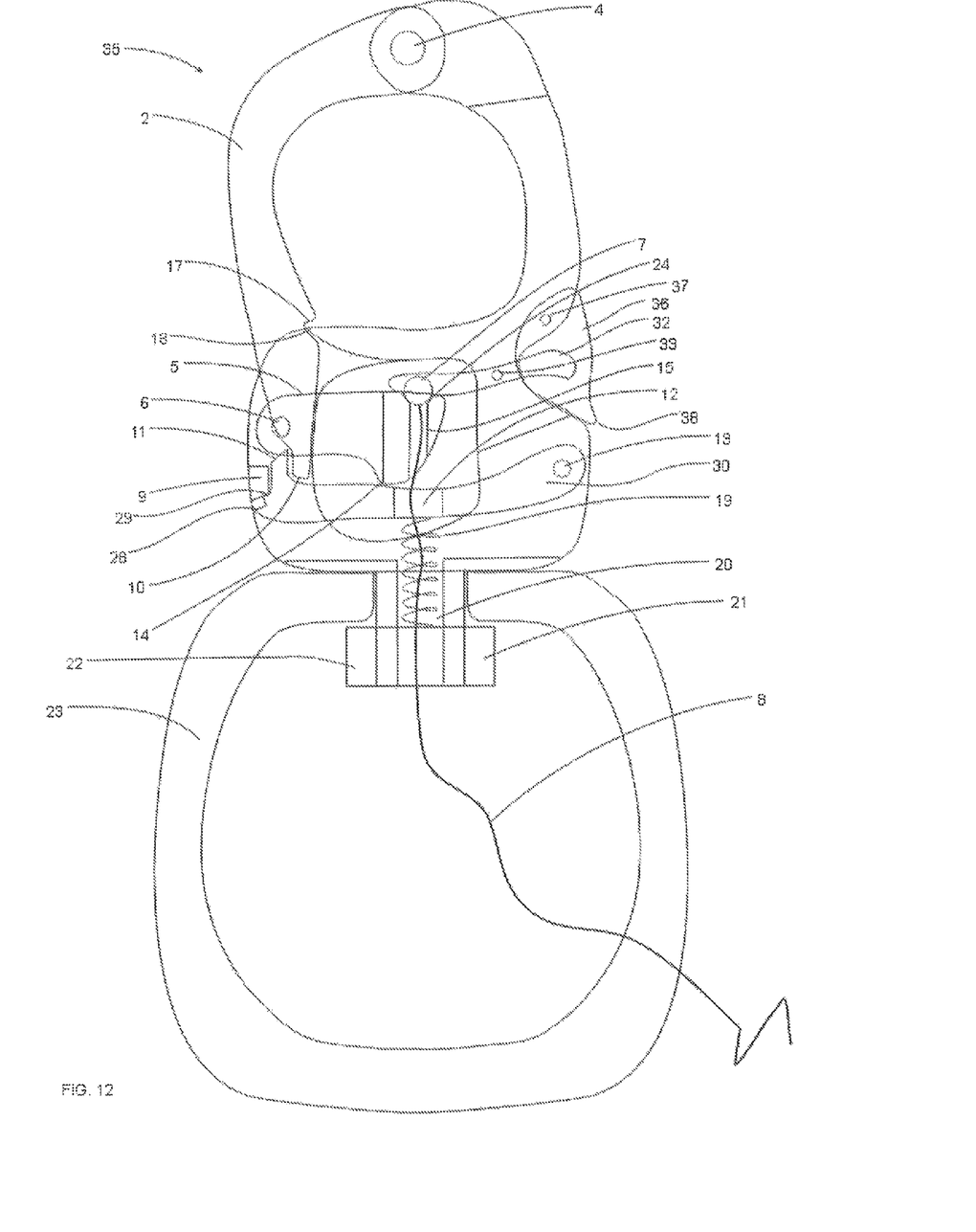
FIG. 12 is a front view of a shackle with a remote release mechanism, a tool activated release point, a finger release lever, and a finger release lever shield shown in the latched position.

Referring to FIG. 12, the shackle with shielded release lever 35 represents another embodiment of the device and method design. As most of the features are similar to or identical to the features of the shackle with release lever 34, this description will focus on and highlight only the differences between the embodiment of shackle with release lever 34 and the embodiment of shackle with shielded release lever 35. The shackle with shielded release lever 35 employs a release lever shield 36 that pivots about the shield pivot 37. Release lever shield 36 provides protection to the finger release lever 32 to prevent accidental shackle release events when the shackle with shielded release lever 35 is handled by a user. The release lever shield 36 employs a shield actuation tab 38 that allows an operator to move the release lever shield 36 in the counterclockwise direction from a "closed" position to an "opened" position. In this configuration, an operator may easily open the release lever shield 36 and release the shackle with shielded release lever 35 in a single motion by continuing to slide the operator's finger or a release tool upwards to release the release lever shield 36 and to actuate the finger release lever 32.

Those skilled in the art of shackles and other releasable devices understand that any or all of the additional features of shackle 26, shackle with release lever 34, and shackle with shielded release lever 35 may easily be incorporated in the designs of shackle 1 and other configurations of releasable devices.

While there have been shown what are presently considered to be preferred embodiments of the present invention, it will be apparent to those skilled in the art that various changes and modifications can be made herein without departing from the scope and spirit of the invention.

What is claimed is:

1. A shackle with low-force release comprising:
   a shackle body;
   a pivot boss having a central lumen and a bottom section;
   a lanyard passed through the central lumen of the pivot boss;
   a ferrule having a central lumen and connected to the bottom section of the pivot boss;
   a first pivot arm having a latch surface and pivotably attached to the shackle body opposite said latch surface;
   a release cam having an activation surface and pivotably attached to the shackle body opposite said activation surface;
   a second pivot arm having a latch surface and pivotably attached to the shackle body opposite said latch surface;
   a latch stop formed on said shackle body; and
   a spring configured to apply a pressure to the second pivot arm to hold the second pivot arm in a first position;
   wherein the first pivot arm is held in the closed position by the latch surface of the second pivot arm when the second pivot arm is in the first position, and
   wherein the first pivot arm is released to the open position when the second pivot arm is moved to a second position.

2. The shackle of claim 1, further comprising:
   a means for connecting the lanyard to the release cam,
   wherein the lanyard is configured to pivot the release cam such that the release cam activation surface pivots the second pivot arm from the first position to the second position when tension is applied to the lanyard.

3. The shackle of claim 2, further comprising:
   a bail rotatably attached to the pivot boss; and
   a line removeably attached to the bail;
   wherein the lanyard is slideably attached to the exterior of the line or rope, or contained within the line or rope.

4. The shackle of claim 1, further comprising a spring configured to hold the second pivot arm in the first position.

5. The shackle of claim 1 further comprising:
   a lanyard guide formed into the release cam;
   a lanyard slot formed into the second pivot arm; and
   a means for attaching the lanyard to the release cam,
   wherein the lanyard passes through the lanyard guide and lanyard slot.

6. The shackle of claim 1, wherein the body further comprises a shackle body stop and the first pivot arm further comprises a pivot arm stop.

7. The shackle of claim 1 further comprising a handle formed into the body to enhance a users' grip.

8. The shackle of claim 1 further comprising a release lever pivotably attached to the body and configured to pivot the release cam when a force is applied to the lever.

9. The shackle of claim 8, further comprising a lever shield pivotably attached to the body and configured to cover the release lever.

10. The shackle of claim 1, further comprising the second pivot arm further configured with a stop configured to contact the latch stop.

11. The shackle of claim 10, wherein a gap is formed in the second pivot arm's stop and configured to allow a tool to be inserted to move the second pivot arm from the first position to the second position thereby releasing the first pivot arm to the open position.

12. The shackle of claim 1, further comprising a bail rotatably attached to the pivot boss.

13. The shackle of claim 1, further comprising a means for pivotably attaching the first pivot arm to the body.

14. The shackle of claim 1, further comprising a means for pivotably attaching the second pivot arm to the body.

15. The shackle of claim 1, further comprising a means for pivotably attaching the release cam to the body.

* * * * *